April 23, 1946.  J. H. ROGERS ET AL  2,398,964
LOADING MACHINE
Filed June 12, 1944    2 Sheets-Sheet 1
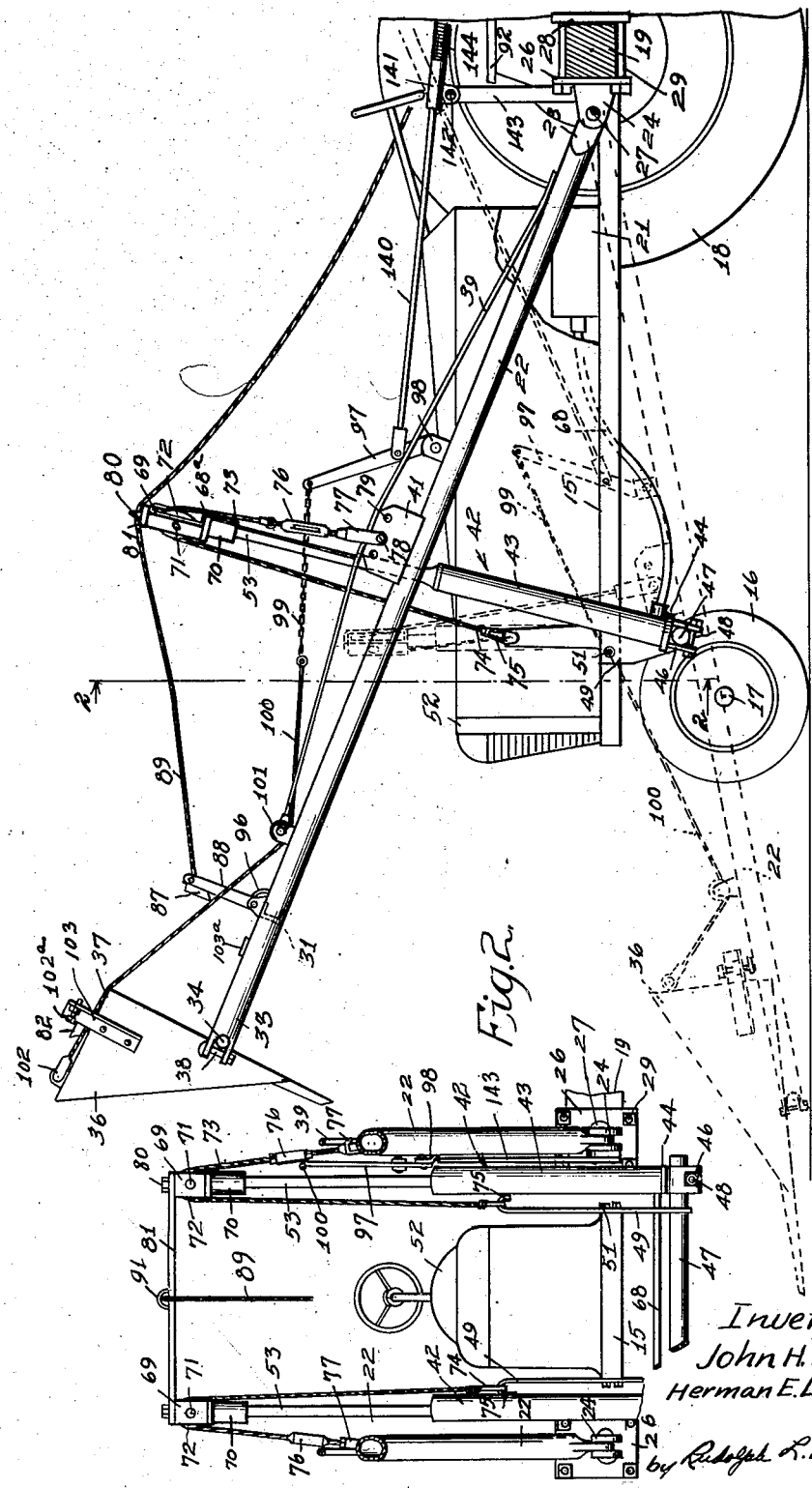
Inventors
John H. Rogers
Herman E. Luebbers
by Rudolph L. Lowell
atty

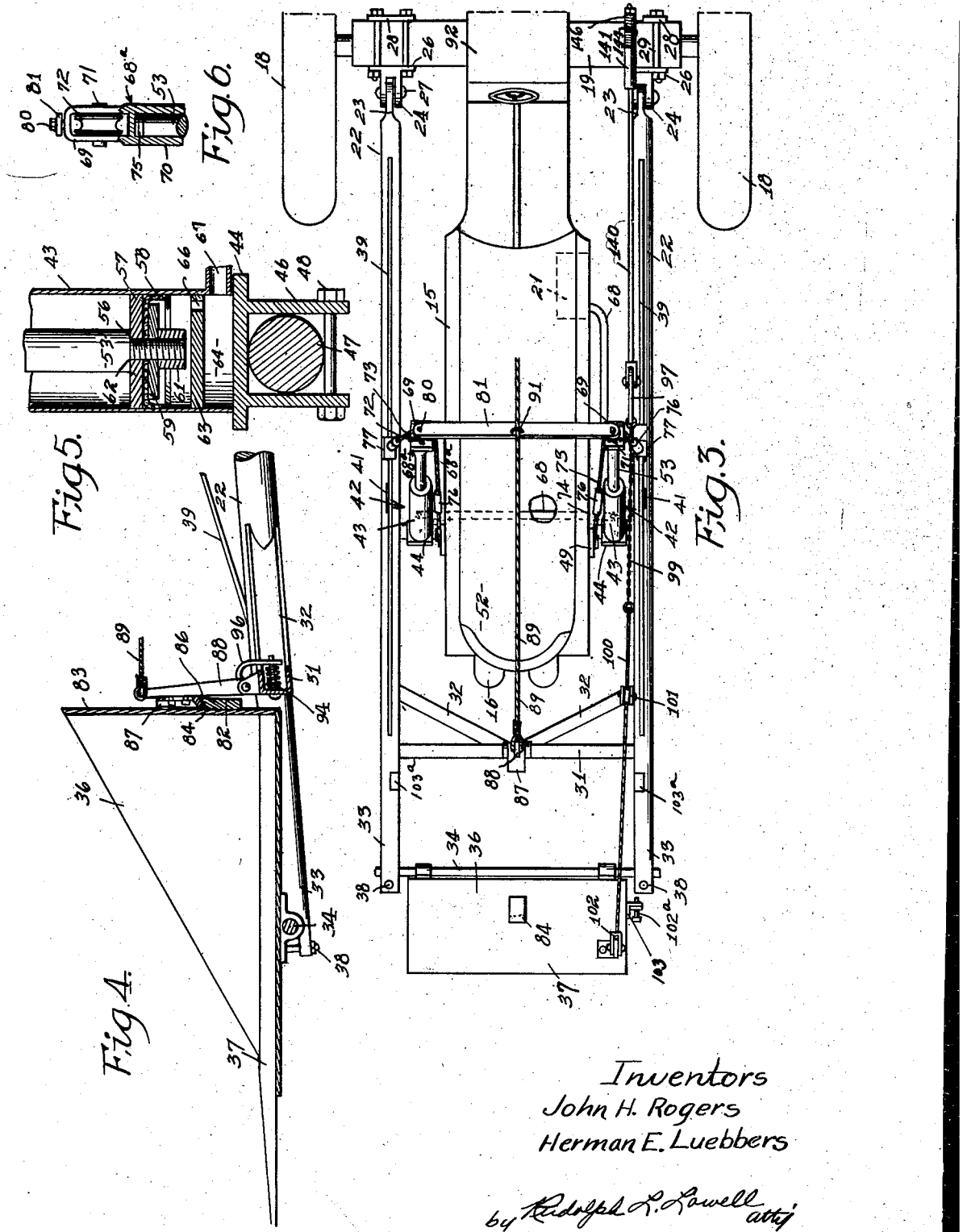

Patented Apr. 23, 1946

2,398,964

UNITED STATES PATENT OFFICE 2,398,964

LOADING MACHINE

John H. Rogers and Herman E. Luebbers, Fort Dodge, Iowa

Application June 12, 1944, Serial No. 539,900

4 Claims. (Cl. 214—140)

This invention relates generally to loading machines and in particular to a loading attachment for a tractor comprising load-lifting members movably supported on the tractor and fluid operated hoists or lifts operable from a source of fluid pressure on the tractor to raise and lower the load-lifting members.

It is an object of this invention to provide an improved loading machine.

Another object of this invention is to provide a loading attachment for a tractor which is of a normal height substantially within the vertical confines of the tractor, light in weight and compact in design so that complete visibility to the tractor operator and normal ease of maneuverability of the tractor is retained during the operation of the attachment.

Yet another object of this invention is to provide a loading attachment for a tractor comprising a lifting member pivoted on the tractor for pivotal up and down movement, in which an upright fluid operated hoist for raising and lowering the lifting member is pivotally supported for pivotal movement longitudinally of the tractor in response to a pivotal movement of the lifting member and held in a pivotally moved position by the action of flexible means operatively connected with the hoist and the lifting member.

A feature of this invention is found in the provision of a loading attachment for a tractor having a pair of lifting arms pivoted at opposite sides of the tractor for up and down movement, in which a pair of upright hoists are arranged between the tractor and a corresponding arm and pivotally supported adjacent their lower ends on the tractor at a position substantially centrally of the arms. Each hoist includes a lifting portion movable upwardly from the upper end of the hoist and adapted to movably support a cable having one end connected to the tractor and an opposite end to a corresponding arm.

Another feature of this invention is found in the provision of a loading machine having a scoop pivotally supported on a load-lifting member, in which the dumping movement of the scoop is limited by means including an upright lever pivoted on the lifting member with its free end connected by a cable with the scoop. A spring pressed rod is pivoted to the lever adjacent its lower pivoted end, and functions as a buffer in the limiting of the maximum dumping movement of the scoop, with the spring action of the rod cooperating with the pivotal action of the lever on lowering of the lifting member, to automatically return the scoop to a normal load carrying position.

Further objects, features and advantages of this invention will become apparent from the following description when taken in connection with the accompanying drawings in which:

Fig. 1 is a side elevational view of the loader attachment of this invention shown in assembly relation with a tractor and with the scoop elevated and in a dumping position;

Fig. 2 is a fragmentary sectional view taken on the line 2—2 in Fig. 1;

Fig. 3 is a plan view of the loader attachment and tractor assembly shown in Fig. 1;

Fig. 4 is a sectional view of the scoop showing the scoop latch mechanism;

Fig. 5 is a fragmentary detail sectional view showing the assembly and construction of the lower end of a hydraulic lift used in the loader attachment shown in Fig. 1; and Fig. 6 is a detail side elevational view of the upper end of the hydraulic lift.

With reference to the drawings the loader attachment of this invention is shown in Figs. 1, 2 and 3 in assembly relation with a tractor comprising a frame 15, front dual wheels 16 supported on an axle 17, and rear wheels 18 supported on an axle 19. The tractor is of a type which includes an oil pump unit, indicated generally at 21, adapted to operate fluid pressure operated attachments and having suitable valve means (not shown) for controlling the operation of such attachments.

The loader attachment of this invention includes a pair of lifting arms 22, of a pipe construction, having flattened rear end portions 23. Each portion 23 is received between a pair of spaced supporting members 24 carried on a clamping plate 26 and is pivoted on a pin 27 extending through the plates 24 to pivotally support a lifting arm 22 for up and down movement. The clamping plate 26 and a clamping plate 28 are oppositely arranged on the rear axle 19 and clamped against the axle 19 by bolts 29.

The front ends of the lifting arms 22 are connected together by a channel shaped frame member 31 extended transversely between the lifting arms 22 at a position forwardly of the tractor and by channel members 32 having their inner adjacent ends connected with the central portion of the frame member 31 and extended in a rearward direction for connection with a corresponding lifting arm 22. The free end 33 of each lifting arm 22 is of a bifurcated construction to rotatably receive a shaft 34 on which a scoop 36 is mounted. The shaft 34 extends across the bottom of the scoop 36 adjacent its forward end 37 and is retained within the bifurcated end portions 33 by bolts 38 projected through the free ends of the bifurcations.

Each lifting arm 22 is reinforced by a truss or bridge member 39 of rod form extended longitudinally along the top of a corresponding arm, and connected at its opposite ends adjacent corresponding opposite ends of an arm. The central portion of a truss member 39 is connected in a spaced relation with a corresponding lifting arm by an upright supporting plate 41 which is welded to the member 39 and to a corresponding lifting arm. As clearly appears in Figs. 1 and 3 a supporting plate is located substantially intermediate the ends of a lifting arm 22.

The arms 22 are pivotally moved up and down by means including a pair of upright hydraulic hoists or lifts 42 arranged at opposite sides of the tractor frame 15 and with a lift positioned between the tractor frame and a corresponding lifting arm 22. Each lift 42 includes a cylinder 43 having a flat base member 44 with a pair of downwardly projected spaced members 46 adapted to receive therebetween a rock shaft 47 arranged rearwardly of the front axle 17 and extended transversely of the tractor frame 15 (Figs. 1 and 5). The base 44 is supported on the rock shaft 47 with the members 46 terminating below the level of the rock shaft. The cylinder 43 is held in a fixed position on the rock shaft for movement therewith by clamping bolts 48 extended through the members 46. The rock shaft 47 is supported at a position below the tractor frame 15 in elongated upright plate members 49 secured to the sides of the tractor frame by bolts or the like 51.

Since each hoist 42 is similarly assembled with a corresponding lifting arm 22 only one of such assemblies will be referred to in detail in the following description.

The cylinder 43 of the hoist 42 is of a height or length such that when the arm 22 is in its lowermost position, as indicated by dotted lines in Fig. 1, the upper end of the cylinder is above the top level of the tractor hood 52. Operatively associated with the cylinder 43 is a lifting or working piston 53. The lower end of the piston 53 (Fig. 5) is formed with a reduced threaded section 56 on which are stacked in the following order a supporting plate 57, a leather plunger 58, a plunger supporting member 59 and a nut 61, with the nut on being tightened clamping the above defined stacked parts against a shoulder 62 at the junction of the main body of the piston and the reduced section 56.

The lowermost position of the piston 53 is defined by the engagement of the bottom end of the section 56 with a plate member 63 extended across the cylinder 43 in an upwardly spaced relation from the base 44 to define an oil reservoir 64, having communication with the upper portion of the cylinder through an opening 66 in the plate member 63. The reservoir is provided with an inlet 67 adapted for connection with a hose connection 68, which in turn is connected with the oil pump unit 21 carried on the tractor.

The upper end of the piston 53 carries a supporting unit 68a (Fig. 6) integrally formed with a top member 69 of an inverted U-shape, and a lower sleeve member 70 adapted to loosely fit over the upper end of the piston 53. A pair of disc bearing members 75 are interposed between the sleeve member 70 and upper end of the piston rod 53 to provide for a free rotation of the unit 68a relative to the piston rod. Rotatably supported between the legs of the top member 69, on a pin 71, is a pulley 72 for movably supporting a cable 73. The pulley 72 (Figs. 1 and 3) is rotatable in a plane extended substantially transversely of the tractor. With the cable 73 supported on the pulley 72 one end 74 of the cable is connected with a hook 75 at the upper end of the bearing plate 49, while its opposite end is connected to a turn buckle 76 which in turn is connected with a U-shaped member 77 arranged in a straddling relation with the brace rod 39 and the supporting plate 41. The U member 77 is pivotally connected with the supporting plate 41 by a pin 78 extended through the free ends of the legs of the U member 77 and through one of the openings 79 in the supporting plate 41. Connection of the cable 73 with the lifting arm 22 is thus adjustable longitudinally of the lifting arm by inserting the pin 78 through a desired one of the openings 79. An adjustment in the length of the cable 73 is accomplished by a manipulation of the turn buckle 76.

In the operation of the hoists 42 assume the lifting arms "22" to be in the dotted line position of Fig. 1. On the concurrent application of a fluid pressure to the cylinders 43, from the unit 21 through the hose connection 68 and inlets 67, the pistons 53 are moved upwardly. Since the cable ends 74 are attached to the tractor frame 15 at the hooks 75 this upward movement of the pistons 53 produces a downward pulling force in the cable portions between their attached ends 74 and the pulleys 72 whereby the lifting arms 22 are raised. By virtue of the pivotal upward movement of the lifting arms 22 the line of application of the pulling force on the lifting arms moves in a direction rearwardly of the tractor. As a result of this rearward movement of the line of application of the pulling force the pulleys 72 tend to assume a position vertically above a corresponding pivoted connection 78 of the cables 73 with the supporting plates 41, so that the hoists 42 pivot with the rock shaft 47 in a direction rearwardly of the tractor, to a position shown in full lines in Fig. 1. Concurrently with the pivotal movement of the hoists 42 the units 68a are rotated relative to the pistons 53 by the action of the cables 73 on the pulleys 72, whereby the cables 73 are retained within the pulleys 72. This rotation of the units further substantially eliminates any rotation of the plunger 58 within the cylinder 43, whereby the service life of the plunger 58 is appreciably increased.

In order to reduce any lagging action in the lifting of the arms 22, so that the arms 22 will be lifted evenly, and to keep the hoists 42 from spreading apart from each other laterally of the tractor, stabilizing means are provided between the upper ends of the pistons 53. The stabilizing means comprises a bar member 81 extended across the tractor between the upper ends of the brackets 89 and pivoted at its ends on bolts 80 secured in the upper ends of the top members 69. The pivotal connection of the bar 81 with the members 69 permits the free formation of the units 68a on corresponding pistons 53. The stabilizing means provides a compensating or cooperative action between the hoists 42 so that the hoists are pivotally moved substantially together and in parallel paths. This stabilizing or compensation action is supplemented by the substantially rigid assembly of each of the cylinders 43 with the rock shaft 47. As a result the opposite ends of each hoist are concurrently acted upon to maintain a like pivotal movement of the hoists.

The arms 22 are lifted and held in any moved position by manipulation of the control valves for the pumping unit 21, with a lowering of the arms being accomplished by relieving the pressure applied to the cylinders 43 in a manner which is well known.

The scoop 36 is held in its normal loading position, shown in dotted lines in Fig. 1, and against pivotal movement on the arms 22 by means including a catch portion 82 projected from the rear side of the scoop back wall 83 and having a tapered top portion 84 adapted for releasable engagement with a mating tapered portion 86 formed on a latch member 87 (Fig. 4). The latch member 87 is adjustably supported for vertical movement on a pivoted arm 88 fulcrumed at its lower end on a center portion of the frame member 31. The free end of the arm 88 is connected with a cable or the like 89 which is extended through a loop member 91 on the stabilizing bar 81 to a position adjacent the seat 92 for the tractor operator (Fig. 2).

As shown in Fig. 4 the rear wall 83 of the scoop 36 is in a clearance relation with the frame member 31. Thus on pivotal movement of the scoop 36 in a clockwise direction, from its dumping position shown in Fig. 1, to its normal position shown in Fig. 4, the latch member 87 and in turn the arm 88 are moved in a direction rearwardly of the tractor by the catch member 82 until the tapered portion 84 is in an engaging position with the tapered portion 86 on the latch member. This engagement is releasably maintained by the action of a spring 94 (Figs. 1 and 4) arranged in compression between the frame member 31 and a depending portion 96 on the lever 88 in a manner to continuously bias the lever 88 in a direction forwardly of the tractor, or in a counterclockwise direction as viewed in Fig. 4. To release the scoop 36 the cable 89 is pulled rearwardly to in turn pivot the arm 88 in a clockwise direction, as viewed in Fig. 4, against the pressure of the spring 94, whereby the latch member 87 is moved out of an engaging position with the catch member 82. The shaft 34, on which the scoop 36 is carried, is so arranged that the weight of the load carried at the forward portion 37 of the scoop 36 pivots the scoop 36 in a counterclockwise direction, as also viewed in Fig. 4, to its dumping position shown in full lines in Fig. 1.

The dumping position of the scoop 36 is limited by means including an upright lever 97 pivoted at its lower end in a bracket 98 mounted on a lifting arm 22 rearwardly of a plate member 41 (Figs. 1 and 3). The lever 97, as shown in dotted lines in Fig. 1, is normally inclined upwardly and rearwardly, which dotted line position is retained when the scoop is elevated to a dumping position. The free end of the lever is connected to the rear end of a chain 99, the front end of which is connected to a rope or cable 100 extended forwardly of the tractor below a pulley 101, rotatably supported on the top of a frame member 32, and then pivotally attached at 102 to the rear wall 83 of the scoop at a position adjacent to the top of the scoop and toward one side thereof.

Pivoted at its front end to the lever 97 and adjacent the lower end of the lever is a rod 140. The rear end portion of the rod 140 is slidable in a tubular member 141 pivoted at 142 to the top of an upright supporting member 143 mounted on the rear tractor axle 19. A spring 144 is supported on the rod 140 and arranged in compression between the tubular member 141 and a nut 146 at the rear end of the rod 140.

When the scoop 36 is dumped the lever 97 is pivotally moved in a forward direction by the chain 99 and cable 100, to its position shown in full lines in Fig. 1, and in turn moves the rod 140 in a forward direction against the pressure of the spring 144. On closing of the spring 144 between the tubular member 141 and the nut 36 the rod 140 is locked against further forward movement and in turn locks the lever 97 against further forward pivotal movement. These locked positions of the rod 140 and lever 97 limit the dumping movement of the scoop 36. By virtue of the spring 144 being compressed to a closed position, as the scoop approaches its maximum dumping position, the spring acts as a shock absorber to prevent any sudden and jarring stopping of the scoop.

After the scoop has been dumped it is automatically returned to a normal position by the action of the spring 144 and the relative movement between the lever 97 and the rod 140 in response to the downward pivotal movement of the lifting arms 22. Thus, as explained above, a pressure is produced in the spring 144 by virtue of its being closed or compressed between the tubular member 141 and the nut 146 when the scoop is dumped. With the load off of the scoop 36 the pressure produced in the spring initially pivots the scoop toward a normal loading position until the spring pressure acting to move the rod 140 and in turn the lever 97 in a rearward direction is substantially equal to the weight of the scoop 36 tending to move the lever 97 in a forward direction. As a result of this initial movement of the scoop 36 the spring 144 is in an equalized condition and incapable of further moving the rod 140 in a rearward direction. Thus on a downward pivotal movement of the lifting arms 22 the pivotal movement of the scoop 36 to a normal position is continued by the movement of the lever 97 in a rearward direction to its dotted line position shown in Fig. 1. This movement of the lever 97 takes place by virtue of the pivotal support of the tubular member 141 above the pivotal support for the arms 22 and the holding of the rod 140 by the spring 144 against movement in a forward direction.

The adjustment of the scoop 36 in a normal position relative to the ground or to a horizontal plane is accomplished by screws 102a adjustably supported rearwardly of the scoop 36, on an angular member 103 secured to a side of the scoop, and adapted for engagement with a rest plate 103a carried on a lifting arm 22.

It is seen, therefore, that with the hoists 42 and an associated lifting arm 22 arranged adjacent one side of the tractor the tractor operator has complete vision for operating and manipulating the tractor during operation of the loading attachment. By virtue of the location of the hoists 42 rearwardly of the front axle 17 and in a suspended position below the tractor frame a substantially long cylinder 43 is capable of being used while retaining the upper end of the cylinder adjacent the top level of the tractor. The location of the hoists 42 rearwardly of the front axle 17 provides for the engagement of the cable 73 with the lifting arms 22 at a point substantially intermediate their ends whereby to increase the elevation of the arms 22 for a predetermined displacement of the pistons 53. In other words the closer the hoists 42 can be arranged to the pivots 23 for the lifting arms 22 the higher the arms 22 can be lifted with a given displacement or movement of the pistons 53. Also with the upper ends of the cylinders 43 adjacent the top level of the tractor the stabilizing means 81, when the pistons 53 are in their lowermost positions, is located adjacent the top of the tractor so as not to interfere with the visibility of the tractor operator during a usual bucking operation.

Although the invention has been described with respect to a preferred embodiment thereof, it is to be understood that it is not to be so limited since modifications and alterations can be made therein which are within the full intended scope of this invention as defined by the appended claims.

We claim:

1. A loading attachment for a tractor comprising a pair of pivoted arms arranged at opposite sides of said tractor for pivotal up and down movement, a pair of upright hydraulic hoists arranged at opposite sides of said tractor, with a hoist positioned between said tractor and a corresponding arm, means pivotally supporting said hoists on said tractor for pivotal movement longitudinally of said tractor, working pistons for said hoists, a bracket carried at the top of each one of said pistons, a pulley rotatably supported on a bracket for rotation in an upright plane, an equalizing link pivotally connected between said brackets, a flexible lifting means movably supported on each of said pulleys, with one end portion of a flexible lifting means attached to said tractor and an opposite end attached to a corresponding arm, and means on said tractor for concurrently operating said hoists to lower and raise said arms.

2. A loading machine comprising a portable frame, a frame unit pivotally supported at its rear end on said portable frame for up and down pivotal movement, a load-carrying means pivotally supported on the forward end of said frame unit, an upright lever pivoted at its lower end on said frame unit intermediate the ends of said frame unit, connecting means movably connected with the free end of said lever and said load carrying means, a stationary upright support on said portable frame adjacent the rear end of said frame unit, a guide member pivoted adjacent the upper end of said stationary upright, an elongated member having one end portion pivoted to said lever and an opposite end portion slidably supported on said guide member, spring means for biasing said elongated member in a rearward direction, said load-carrying means, on being dumped, acting through said connecting means to pivot said lever and move said elongated member in a forward direction against the pressure of said spring means, with said load carrying means being returned to a normal position by the initial action of said spring means to move said elongated member in a rearward direction, and by the later action of said spring means to move said elongated member in a rearward direction as said frame unit is lowered.

3. A loading machine comprising a frame, a pair of pivoted lifting arms arranged at opposite sides of said frame and pivoted at their rear ends on said frame, a scoop pivotally supported between the forward ends of said arms, means for limiting the dumping movement of said scoop including an upright lever pivoted on one of said arms intermediate the ends thereof, connecting means movably connected with said scoop and the free end of said lever, an upright support on said frame adjacent the rear end of said one arm, means pivoted on said upright support at a position spaced upwardly from the pivotal support of said one arm, a rod pivoted at its forward end to said lever and having its rear end slidably supported on said pivoted means, a stop member on said rod rear end portion, coil spring means on said rod arranged in compression between said pivoted means and said stop member, said scoop, on being dumped, acting through said connecting means to pivot said lever to move said rod in a forward direction against the pressure of said spring means to a limiting position defined by the closing of said spring means between said pivoted means and said stop member, with said scoop being returned to a normal position by the initial rearward movement of said rod in response to the expansion of said spring means, and the later rearward movement of said rod in response to a downward pivotal movement of said arms.

4. A loading attachment for a tractor comprising a pair of pivoted arms arranged at opposite sides of said tractor for up and down pivotal movement, a pair of upright hydraulic cylinders arranged at opposite sides of said tractor, with each cylinder arranged between said tractor and an adjacent pivoted arm, means pivotally supporting said cylinders on said tractor for pivotal movement longitudinally of said tractor, pistons operatively associated with said cylinders, a pair of bracket members, means rotatably supporting each bracket member on the upper end of a piston for rotation relative to the piston about the longitudinal axis of the piston, pulleys rotatable on said bracket members for rotation in an upright plane, a pair of cables, with each cable being movably supported intermediate its ends on one of said pulleys and having one end attached to said tractor and an opposite end attached to an adjacent pivoted arm, with each bracket member being rotated by an associated cable in response to a pivotal movement of said pivoted arms to maintain said cable in operative assembly with an associated pulley, a link member pivotally connected between said bracket members, and means for concurrently operating said pistons to raise and lower said pivoted arms.

JOHN H. ROGERS.
HERMAN E. LUEBBERS.